March 31, 1964   S. R. TYLER   3,126,942
FUEL SUPPLY SYSTEMS FOR SPILL BURNER NOZZLES
Filed April 18, 1960   2 Sheets-Sheet 1
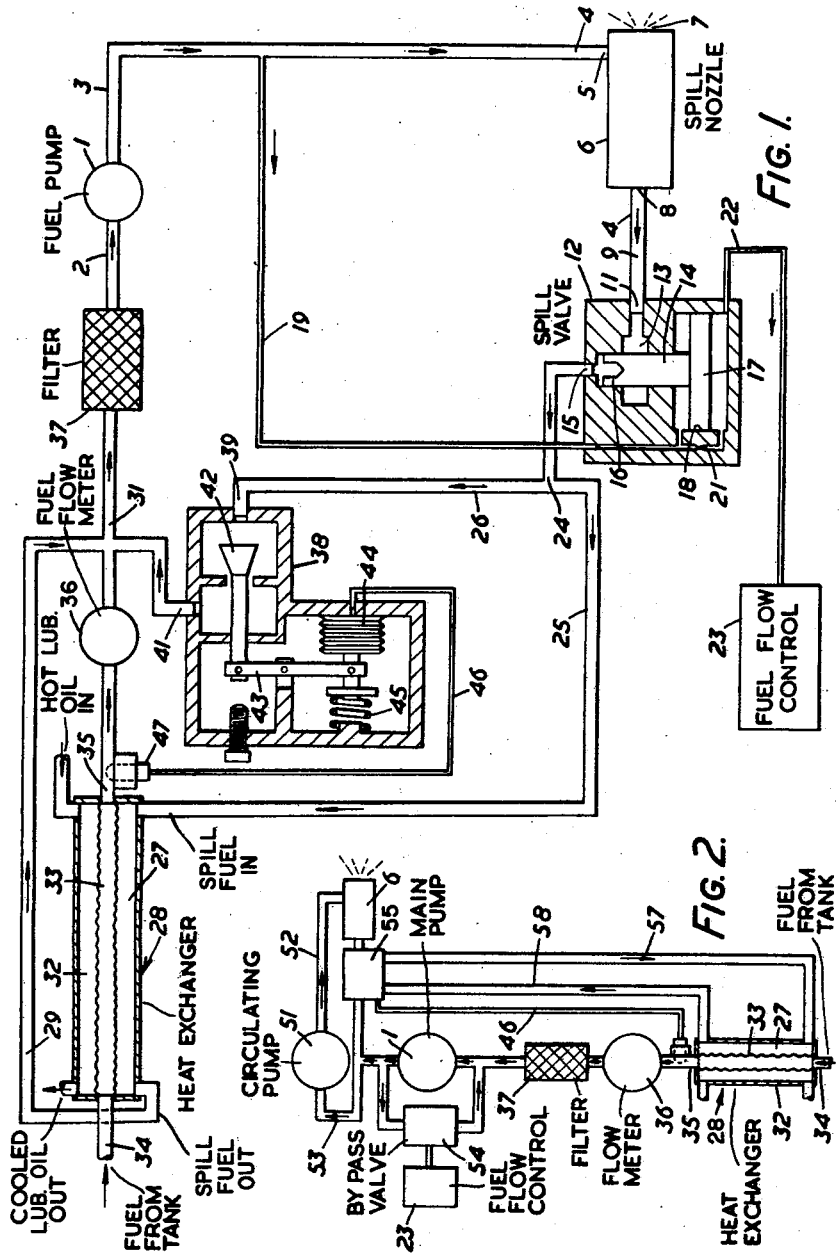
INVENTOR
STANLEY R. TYLER
BY Reynolds, Beach &
Christen
ATTORNEYS

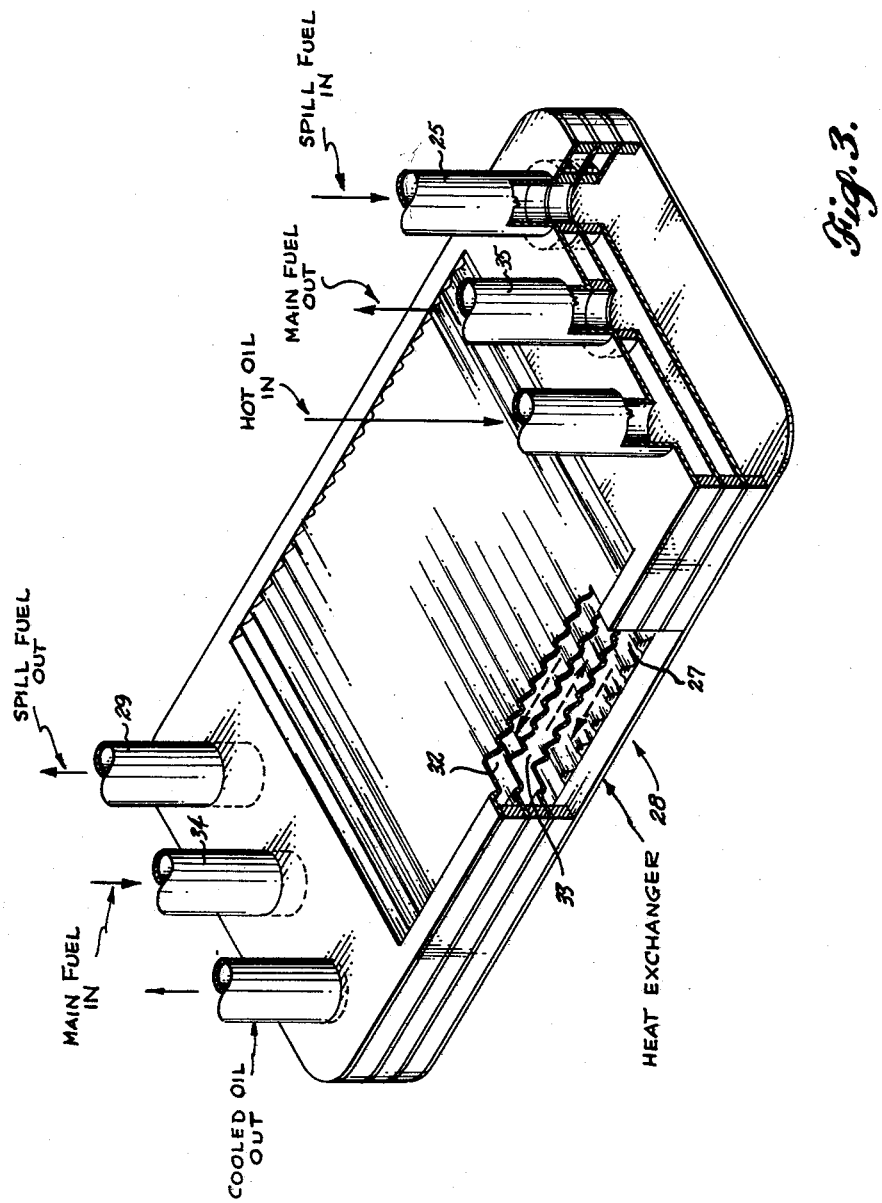

United States Patent Office 3,126,942
Patented Mar. 31, 1964

3,126,942
FUEL SUPPLY SYSTEMS FOR SPILL BURNER NOZZLES
Stanley Ralph Tyler, Cheltenham, England, assignor to Dowty Fuel Systems Limited, Cheltenham, England, a British company
Filed Apr. 18, 1960, Ser. No. 23,028
Claims priority, application Great Britain Apr. 20, 1959
5 Claims. (Cl. 158—36.3)

This invention relates to fuel supply systems for use with one or more spill nozzles or spill distributors and is particularly, although not exclusively, intended for use in the supply of fuel to aircraft gas turbine engines. A spill nozzle or a spill distributor includes a swirl chamber to which fuel is delivered tangentially to cause fuel swirl within the chamber, a discharge opening at one end of the chamber and a spill opening at the opposite end of the chamber, the fuel supplied to the swirl chamber leaving partly through the discharge opening and partly through the spill opening, depending on the pressure difference existing between spill and discharge openings. For the purpose of this specification one or more spill nozzles or spill distributors will be referred to by the term "spill nozzle."

A spill nozzle may be fed with fuel by one of two basic systems, as follows:

(a) A high pressure pump arranged to draw fuel from a low pressure source and to pump it to the spill nozzle inlet and a spill valve arranged to control spill flow from the spill opening to a low pressure zone by variable throttling action in order to control fuel discharge from the discharge opening. This system is known as a single circuit system.

(b) A main pump arranged to pump fuel from a low pressure source to a circulating system comprising a circulating pump whose outlet and inlet are connected respectively to inlet and spill openings of the spill nozzle, the delivery rate to the circulating system being adjustable to determine spill nozzle discharge. The main pump may be of fixed displacement with its delivery controlled by a bypass valve and/or it may be a variable displacement pump, or it may be a centrifugal pump controlled by line throttling.

In either of these basic systems, particularly when used for fuel supply to aircraft engines, there is the danger that fuel carried in the supply tanks might drop in temperature to a sufficiently low value to cause water globules in the fuel to freeze and it is highly desirable that such freezing of water globules should not be allowed to take place in parts of the fuel system such as the pump, or pumps, the flow meter or the filter, since damage and/or incorrect functioning might result.

The object of this invention is to provide simple means in a fuel system for use with a spill nozzle, to heat supply fuel before it reaches the fuel system so as to reduce the possibility of damage and/or incorrect functioning due to ice formation.

In accordance with the present invention, a fuel system for use with a spill nozzle includes a heat exchanger through which supply fuel and spill fuel are arranged to flow in heat exchange relation, the spill fuel flowing from the heat exchanger to the high pressure pump inlet in the case of a single circuit system or to the circulating pump in the case of a two circuit system, whilst supply fuel flows from the heat exchanger into the fuel system. In this way the supply fuel is heated by the spill fuel before it reaches the fuel system. In the case of a single circuit system it is preferred that the spill valve should be located between the spill nozzle and the heat exchanger, to ensure that spill fuel passing through the heat exchanger is at low pressure, rendering possible a comparatively light construction of heat exchanger. Since under most circumstances in both basic types of system spill fuel flow from the spill nozzle is considerably higher than the actual flow rate of fuel delivered by the spill nozzle from its discharge opening, a flow divider may be provided to divide spill flow into two parts, one part of which flows through the heat exchanger and the other part of which bypasses the heat exchanger. The flow divider may be variable in operation and adapted for control by means of a thermostat sensitive to the temperature of supply fuel delivered from the heat exchanger. The purpose of this in the single circuit case is to keep the flow meter temperature variations to a minimum and to prevent access of ice to the flow meter. In the two circuit case it also acts to prevent excessive temperature variation in the main pump. The flow divider may also be controlled by flow responsive means within the system, e.g. it may be controlled by flow through the heat exchanger. Where the fuel system is for supply of fuel to a gas turbine engine, it may also be arranged that lubricating oil is circulated through the heat exchanger to cause transfer of heat from the lubricating oil to the supply fuel.

Two examples of the invention for the supply of fuel to a gas turbine engine will now be described with reference to the accompanying drawings, in which:

FIGURE 1 is a schematic diagram of a single circuit example;

FIGURE 2 is a schematic diagram of a two circuit example; and

FIGURE 3 is a view in perspective of the heat exchanger used in the examples of FIGURES 1 and 2, there being certain portions of its casing removed to reveal its interior.

In FIGURE 1 the example uses the single circuit system in which a high pressure fuel pump 1 pumps fuel from its inlet connection 2 to its delivery connection 3, from whence it is carried by pipe 4 to the supply connection 5 of a spill nozzle 6. One spill nozzle only is shown, but this may be taken as indicating a plurality of such nozzles connected in parallel. The spill nozzle shown includes a swirl chamber to which fuel is delivered from the supply connection 5 through tangential orifices to cause fuel swirl within the chamber, an outlet orifice 7 being provided at one end of the swirl chamber through which some of the fuel leaves in the form of a conical spray whilst another orifice is provided at the opposite end of the chamber through which spill fuel flows to the spill connection 8 of the nozzle 6. Spill fuel from the connection 8 passes through pipe 9 to the inlet connection 11 of a spill valve 12. Fuel from the connection 11 passes to a port 13 within the valve, within which a valve member 14 is movable to determine a valve opening into an outlet port 15 from the spill valve. The valve opening is determined by a shaped portion 16 at the end of the valve member 14. Valve member 14 is moved by means of a servo piston 17 carried within a servo cylinder 18. The servo piston 17 is controlled on the servo vent principle by means of a high pressure fuel supply carried by a pipe 19 on the delivery connection 3 of the fuel pump and connected to the upper end of the cylinder 18, a further connection through a restrictor 21 being made to the lower end of the cylinder 18. A vent pipe 22 extends from the lower end of cylinder 18 to a fuel flow control unit 23 which includes a vent valve controllably acting on the vent pipe 22 to allow an escape of fuel in connection with the signals received by the fuel flow control. Such a fuel flow control may include a number of well known devices used in fuel supply systems such, for example, as an engine speed governor, an air fuel ratio control and a minimum fuel flow control. The exact construction of these devices is not relevant to the present application except in that they act to determine a servo fuel flow through the pipe 22 which determines a pressure drop through the restrictor 21 and a pressure difference between the upper and lower sides of the piston 17 which will cause it to move in accordance with the fuel flow control to adjust the throttle opening 16 between the inlet 11 and outlet 15 of the spill valve.

The outlet from the spill valve is connected to a flow divider comprising a T junction 24 from which fuel may flow either along a pipe 25 or along a pipe 26. The pipe 25 is connected to a passage 27 of a heat exchanger 28 and is arranged to flow from one end of the passage to the other, where it leaves through a pipe 29 and flows into a pipe 31. Within the heat exchanger (FIGURE 3) two liquid flow passages 32 and 33 are provided which give a large surface area contact with the spill fuel flowing through the passage 27. The heat exchanger is preferably of the kind made by cold welding a plurality of aluminium sheets together to leave flow passages between the sheets in good heat exchange relation. Cold fuel from the fuel tank enters the connection 34 to the passage 33 and leaves the passage 33 at outlet 35. The outlet 35 connects directly to the fuel flow meter 36 which may comprise any well known type, for example, it may comprise a fixed displacement hydraulic motor arranged to drive a counting device to count the number of turns and the rate of turns or, alternatively, it may comprise a vane device rotatably mounted within a casing to be rotated by fuel flow and carrying a permanent magnet which induces an alternating voltage in an electrical winding disposed externally of the casing, an electrical counting means then being provided to count both the frequency and total number of alternations of the voltage developed in the winding. Fuel leaves the flow meter 36 through pipe 31 and enters a filter 37 from whence it flows to the inlet 2 of the fuel pump 1. The flow passage 32 within the heat exchanger 28 carries lubricating oil from the engine so as to be in heat exchange relation with the fuel in the passage 27 and the supply fuel in the passage 33.

The pipe 26 from the T junction 24 enters a thermostatically controlled throttle valve unit 38 at connection 39 and leaves at outlet connection 41 from whence it flows into the pipe 31. Flow between connections 39 and 41 is controlled by a throttle valve member 42 which is adjustably carried within the unit 38 by means of a pivoted lever 43. The lever is adjusted as to its angular position by means of a metal bellows 44 opposed in its action by a compression spring 45. The bellows 44 is connected by means of pipe 46 with a metallic bulb 47 located in the exit connection 35 of supply fuel from the heat exchanger 28. The liquid contained within the bulb 47 will expand in accordance with the temperature at the outlet 35 which, in turn, will cause expansion of the bellows 44 to adjust the position of the throttle valve 42. The arrangement is that as temperature increases at the outlet 35, bellows 44 will expand to open the throttle valve 42 to allow an easier passage for liquid between connections 39 and 41, thereby reducing the proportion of spill fuel which flows through the pipe 25 to the heat exchanger 28. In this way the proportion of spill fuel flowing through the heat exchanger may be adjusted to maintain a substantially constant temperature at the outlet connection 35 for supply fuel.

In normal operation of the system as described, fuel is delivered from the fuel tank by means of a boost pump, not shown, to enter the connection 34 of the heat exchanger and to flow through the heat exchanger to the passage 33. Whilst flowing through the heat exchanger the supply fuel is heated by the spill fuel flowing through the passage 27 of the heat exchanger and the temperature of supply fuel leaving the connection 35 is detected by the bulb 37 to adjust the relative proportions of spill liquid which will flow in the pipes 25 and 26. The fuel flow then enters the flow meter 36 where the flow rate and total quantity of fuel are indicated or recorded. The supply fuel, after leaving the flow meter 36, is joined by the spill fuel which enters through pipe 29 and from connection 41 and the sums of these fuel flows then flow through pipe 31 to the filter 37 and to the inlet 2 of the fuel pump 1. Fuel delivered by the fuel pump through the pipe 3 enters the supply connection 5 of the spill nozzle and some of the fuel will leave the spray orifice 7 as spray, whilst the remainder will flow through the spill connection 8 to the spill valve 12 for control as desired, in accordance with the fuel flow control unit 23. Fuel, in flowing through the spill nozzles 6 to the spill connections 8, will become heated, firstly because of the pressure energy dissipated within the fuel and, secondly, because of the fact that spill nozzles are usually disposed within an engine combustion chamber and operate at a substantial temperature. The heated spill fuel is controlled by the spill valve 12 from whence it flows to the T junction or flow divider 24 and a proportion thereof enters the casing of the heat exchanger to transfer its heat to the supply fuel coming from the tank. Of the total fuel flow delivered by the pump 1 it is usual for a small fraction, about one-eighth, to be delivered from the spill orifice 7 as spray and for the remaining seven-eighths to pass as spill flow through the connection 8. The arrangement that the spill flow should join the pipe 31 after the supply fuel has passed through the fuel flow meter ensures that the flow meter registers only the flow rate of fuel which is sprayed from the nozzle 7 and also ensures that heat from the spill flow is transferred to the supply flow before it enters the flow meter 36, thus melting any solidified matter contained within the fuel from the fuel tank. It is also useful to cool the engine lubricating oil passing through the passage 32 in the heat exchanger. Such heat from lubricating oil is transferred to the supply fuel but in normal circumstances, heat from the lubricating oil is insufficient to ensure that the supply fuel is raised to a sufficiently high temperature to ensure melting of all solidified matter.

The provision of the spill valve 12 in between the spill connections 8 and the heat exchanger 28 ensures that fuel passing through passage 25 to the heat exchanger is at a comparatively low pressure whereby the heat exchanger is at a comparatively low pressure whereby the heat exchanger construction may be comparatively light.

Reference is now made to FIGURE 2 of the drawings. The example shown employs a two circuit system. Where possible similar numerals to those used in FIGURE 1 will be used. The main pump 1 receives fuel from the outlet 35 of the heat exchanger 28 and delivers it through flow meter 36 to the circulating system. The circulating system comprises the spill nozzle 6 connected with the circulating pump 51 by means of pipes 52 and 53. The measured flow delivered from flow meter 36 is pumped by pump 1 into the pipe 53 carrying fuel from the spill opening of the spill nozzle 6 to the inlet of the circulating pump 51, but it is equally possible to arrange for the pump 1 to deliver the measured flow from the flow meter into the pipe 52 carrying fuel from the circulating pump to the supply connection on the spill nozzle 6. The fuel delivered by the main pump 1 is controlled by a bypass valve 54 which is connected between the inlet and outlet of the main pump 1. In effect, the bypass valve 54 resembles spill valve 12 of FIGURE 1 and it will employ a similar servo control. The bypass valve 54 is controlled by a fuel flow control device 23 which may be as described with reference to FIGURE 1. A combined flow divider and throttle valve unit 55 is connected in series with pipe 53 which carries spill flow from the nozzle 6 and the action of the unit 55 is to divert some of the spill flow through pipe 57 to passage 27 in heat exchanger 28, return flow from passage 27 passing along pipe 58 back to the unit 55. In effect the unit 55 comprises the combination of the T junction 24 and the throttle valve unit 38 of FIGURE 1. As in FIGURE 1, the throttle valve unit is thermostatically controlled by means of a bulb 47 sensing the temperature of supply fuel at the delivery 35 from the heat exchanger, this bulb being connected by pipe 46 to the unit 55. As in FIGURE 1, a further passage 32 is provided within the heat exchanger to receive lubricating oil from the engine to cool it. In this example, filter 37 is in series with the delivery 35 from the heat exchanger and the inlet of the main pump 1.

In operation, fuel is supplied to the inlet 34 of the heat exchanger at low pressure from the fuel supply tank and passes through the filter to the inlet of the main pump 1. The actual delivery from the main pump 1 is determined by the setting of bypass valve 54 which is adjusted by the fuel control 23, this bypass valve serving to bypass some of the delivered flow back into the inlet of the pump. The fuel flow rate entering the combination formed by the pump 1 and bypass valve 54 is determined by the flow meter 36 and this measured flow rate is delivered from the combination of pump 1 and bypass valve 54 into the pipe 53 extending from the spill nozzle spill connection to the circulating pump inlet. The flow delivered by the pump 1 represents the actual rate of delivery of sprayed fuel from the spill nozzle 6 but, in fact, the flow of fuel around the circulating system is considerably greater than the rate of delivered fuel from the pump 1. Some of the spill fuel from the spill nozzle 6 is deflected through pipe 57 to the heat exchanger and it delivers its heat to the incoming supply fuel from the inlet 34, thus heating the supply fuel before it reaches the flow meter 36, filter 37 and the main pump. In this way any ice particles within the fuel will be melted, thus eliminating the chance of damage to the fuel system or of incorrect functioning thereof.

I claim as my invention:

1. In combination with a fuel system having a source of fuel, a flow meter, a fuel pump, a spill nozzle, and duct means communicating with each of the source, meter, pump, and nozzle to form a circuit in which incoming fuel from the source is passed through the meter and then pumped into the nozzle, and spill flow from the nozzle is returned to the pump, means for preheating the incoming fuel comprising heat exchanger means having the portion of the circuit joining said fuel source and said meter passing therethrough, the portion of the circuit which returns spill flow to the pump being connected with said heat exchanger means to pass at least a portion of the spill return therethrough in heat transfer relation with the incoming fuel.

2. In combination, a source of fuel, a heat exchanger, a flow meter, a fuel pump, a spill nozzle, and duct means communicating with each of the source, the exchanger, the meter, the pump, and the nozzle to form two flow paths in one of which incoming fuel from the source is passed, first through the heat exchanger, then through the flow meter, and then pumped into the nozzle, and in the other of which at least a portion of the fuel spilled from the nozzle is passed, first through the heat exchanger in heat transfer relation with the incoming fuel, and then back into said one flow path downstream of the meter.

3. The combination according to claim 2 further comprising control means responsive to the temperature of the incoming fuel to vary the magnitude of the portion of the spill flow which is passed through the heat exchanger.

4. The combination according to claim 3, wherein the control means includes valve means operative to vary the magnitude of the portion, and a thermostatic control for the valve means which is responsive to the temperature of the incoming fuel at a point in said one flow path intermediate the heat exchanger and the flow meter.

5. The combination according to claim 2, wherein the other flow path communicates with said one flow path intermediate the flow meter and the pump.

References Cited in the file of this patent

UNITED STATES PATENTS

| 1,968,293 | Gould | July 31, 1934 |
| 2,747,555 | Brunner | May 29, 1956 |
| 2,878,889 | Gilbert | Mar. 24, 1959 |

FOREIGN PATENTS

| 573,550 | Canada | Apr. 7, 1959 |
| 823,236 | France | Oct. 11, 1937 |

OTHER REFERENCES

Power Engineering (Technical Publishing Company), volume 59, April 1955, pages 82 to 86, 122 and 123 relied on.